US011995979B2

(12) United States Patent
Torres

(10) Patent No.: US 11,995,979 B2
(45) Date of Patent: May 28, 2024

(54) TACTILE FEEDBACK PLATFORM

(71) Applicant: Daniel Torres, Orlando, FL (US)

(72) Inventor: Daniel Torres, Orlando, FL (US)

( * ) Notice: Subject to any disclaimer, the term of this patent is extended or adjusted under 35 U.S.C. 154(b) by 0 days.

(21) Appl. No.: 17/687,260

(22) Filed: Mar. 4, 2022

(65) Prior Publication Data

US 2023/0282081 A1 Sep. 7, 2023

(51) Int. Cl.
*G08B 6/00* (2006.01)
*G08B 5/36* (2006.01)
*G08B 7/06* (2006.01)

(52) U.S. Cl.
CPC ................. *G08B 6/00* (2013.01); *G08B 5/36* (2013.01); *G08B 7/06* (2013.01)

(58) Field of Classification Search
USPC .... 340/407.1, 474, 482, 488, 515, 521, 525, 340/426.23, 426.25, 870.42, 582, 7.6
See application file for complete search history.

(56) References Cited

U.S. PATENT DOCUMENTS

| | | | | |
|---|---|---|---|---|
| 10,305,720 | B1 * | 5/2019 | Sherbondy | G02B 27/0172 |
| 2009/0007458 | A1 * | 1/2009 | Seiler | A61H 23/0236 340/407.1 |
| 2015/0094914 | A1 * | 4/2015 | Abreu | B60H 1/00742 701/1 |
| 2018/0126263 | A1 * | 5/2018 | Seiler | G09B 5/06 |
| 2018/0213321 | A1 * | 7/2018 | Sampson | G06F 3/016 |
| 2020/0038767 | A1 * | 2/2020 | Smoot | A63G 31/02 |
| 2020/0067341 | A1 * | 2/2020 | Glover | H02J 50/80 |

* cited by examiner

*Primary Examiner* — Daniel Previl
(74) *Attorney, Agent, or Firm* — Jason T. Daniel, Esq.; Daniel Law Offices, P.A.

(57) ABSTRACT

A tactile feedback platform includes a main body having a flat top wall and a plurality of sidewalls that define an interior space. An amplifier is positioned along the main body and includes jacks for connecting to an external entertainment system. The amplifier is connected to a plurality of tactile transducers that are located within the main body. The transducers function to vibrate the top wall of the platform in response to signals received from the entertainment system connected to the amplifier. A system controller is connected to the amplifier, the transducers and a plurality of that are located lights along the main body. The controller functions to communicate wirelessly with a smartphone using a mobile application to control the operation of the platform.

19 Claims, 5 Drawing Sheets

TACTILE FEEDBACK PLATFORM

TECHNICAL FIELD

The present invention relates generally to music and entertainment devices, and more particularly to a platform for providing tactile feedback to a user.

BACKGROUND

The statements in this section merely provide background information related to the present disclosure and may not constitute prior art.

When performing live or recorded music, it is important for the performer to be able to feel the music they are sending to the crowd. With particular regard to onstage DJ's this tactile feedback is important as they are working multiple pieces of equipment at a time and in many instances aren't able to listen to the output the way the crowd does. As such, feeling the beat keeps the DJ in tune with the music as they perform.

In most instances, performers rely on the bass and treble emanating from the music speakers during the performance to supply the tactile feedback; however, some instances such as private parties with strict noise ordinances, and/or the increasingly popular silent raves (wherein all partygoers wear headphones), does not permit the use of loud music.

Accordingly, it would be beneficial to provide a tactile feedback platform that can be connected to an entertainment system to cure the deficiencies above. Such a system being equally beneficial for use by non-performers, such as individuals using virtual reality systems to play games and/or travel the Metaverse, for example.

SUMMARY OF THE INVENTION

The present invention is directed to a tactile feedback platform. One embodiment of the present invention can include a main body having a flat top wall and a plurality of sidewalls that define an interior space. Wheels and a handle can be secured to the main body to allow joint use as a dolly for transporting entertainment equipment.

An amplifier can be positioned along the main body and can include any number of jacks for connecting to any type of audio-visual device entertainment system. In one embodiment, the amplifier can be connected to a plurality of tactile transducers which can be located within the main body. The transducers can function to vibrate the top wall of the platform in response to signals received from the entertainment system connected to the amplifier.

In one embodiment, the platform can include a system controller that is connected to the amplifier, the transducers, and a plurality of lights along the main body. The controller can communicate wirelessly with a smartphone using a mobile application to control the operation of the platform.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
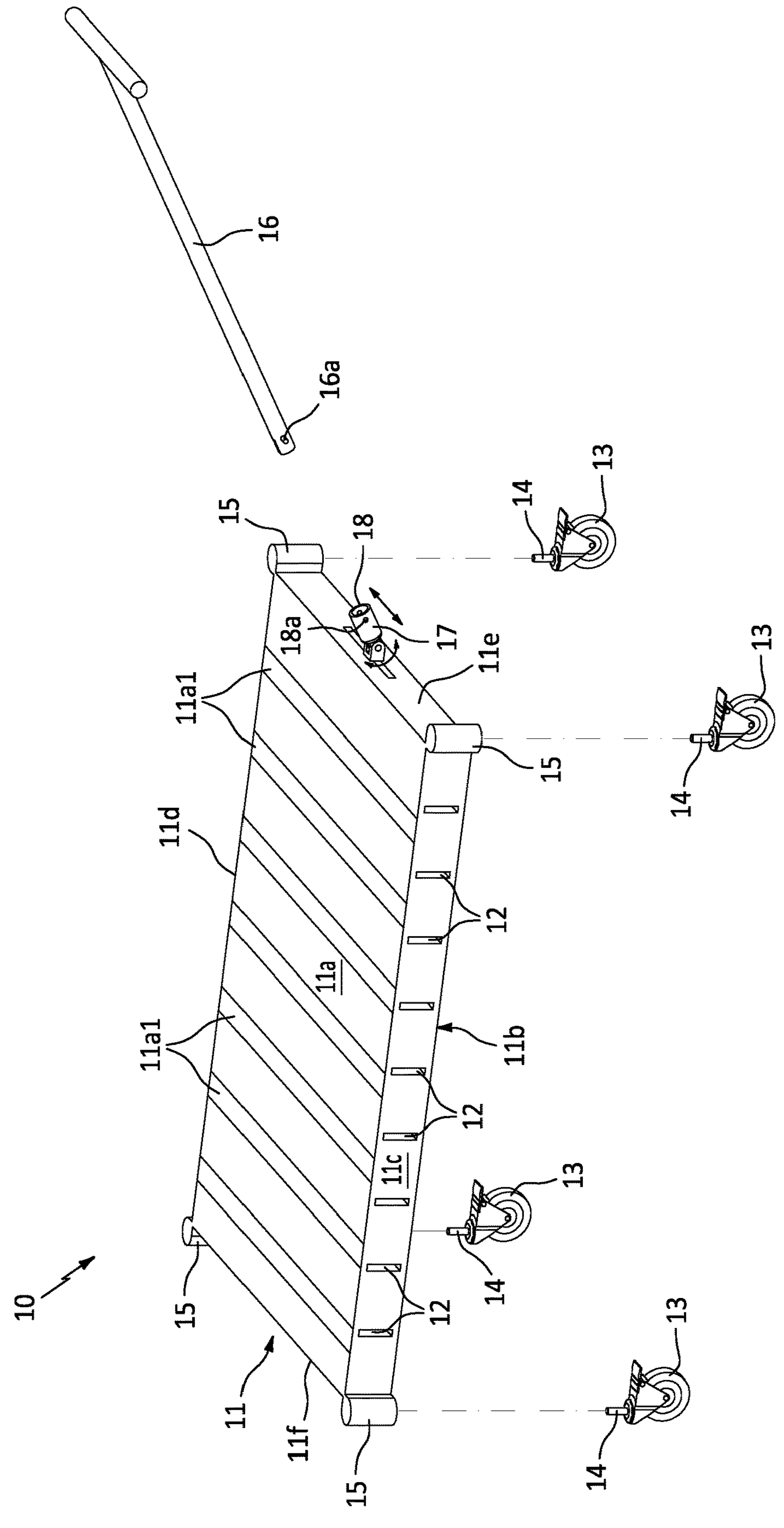
FIG. 1 is a perspective view of the tactile feedback platform that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples include opposing strips of hook and loop material (i.e. Velcro®), attractively-oriented magnetic elements, flexible strips of interlocking projections with a slider (i.e., zipper), a thin, flexible strap with a notched surface and one end threaded through a locking mechanism (i.e., zip tie) at the other, tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

FIGS. 1-5 illustrate one embodiment of a tactile feedback platform 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in FIG. 1, the platform 10 can include a main body 11 for receiving and housing the below described electronic components. In one embodiment, the main body can include a generally rectangular shaped member having a top wall 11*a*, a bottom wall 11*b*, a front end 11*c*, a back end 11*d* and a pair of sides 11*e* and 11*f* that define a generally hollow interior space.

As will be described below, the main body is designed to support the weight of a user standing on the top wall 11*a*. As such, the top wall will preferably include a generally flat surface along its entirety to permit the user to stand anywhere along the platform surface. Moreover, the main body may further include internal bracing or other such structure for supporting the weight of an adult human weighing in excess of 225 pounds, for example. Additionally, the top wall may include an anti-skid layering 11*a*1 such as traction strips, for example.

In the preferred embodiment, a plurality of openings 12 can be positioned along the main body 11. Each of the openings can function to supply fresh air to the below described tactile transducers in order to allow the same to operate at peak efficiency. Although described above with regard to a specific shape, this is for illustrative purposes only, as other embodiments are contemplated wherein the main body includes any number of different shapes.

As described herein, the main body 11 may be formed from materials that are, for example, relatively strong and stiff for their weight. Several nonlimiting examples include but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), natural materials such as wood, and/or various composite materials (e.g., carbon fibers in a polymer matrix, fiberglass, etc.).

In the preferred embodiment, the platform 10 can be designed so as to be portable in nature to allow a performer to easily setup, breakdown and transport the device between shows. To this end, one embodiment of the system 10 can include a plurality of removeable wheels 13 each having an elongated shaft 14 that can be secured within engaging receptacles 15 located along the main body. Such a feature allowing a user to remove the wheels when setting up the device in order to position the bottom surface 11*b* directly on the floor to create a stable non-moving platform to stand or sit on when using the same.

Conversely, when the wheels are attached, the platform can be easily rolled from one location to another. Moreover, the flat top wall 11*a* permits the user to physically stack other equipment onto the platform in order to allow the platform 10 to operate as a dolly for transporting the performers other equipment to and from the venue. Although described above with regard to removable wheels, this is for illustrative purposes only, as other embodiments are contemplated wherein the wheels are permanently attached to the main body and function to retract and extend therefrom in order to allow the platform to function in the manner described herein.

In one embodiment, an elongated handle 16 can be removably connected to the main body 11 in order to permit a user to push or pull the device via the wheels 13. In the illustrated embodiment, a hinge mechanism 17 can be positioned along the main body 11. The hinge mechanism can include a pole receptacle 18 having apertures 18*a* for engaging spring-loaded locking pins 16*a* on the handle when the same is positioned within the receptacle. The hinge mechanism will preferably include two rotation axes that are arranged perpendicular to each other, thus allowing the hinge to be omnidirectional in nature.

Moreover, such a feature permits the hinge to be oriented flat against the side of the main body when the handle is not connected in order to ensure a user does not trip on the hinge during operation of the device. Although described above with regard to a particular type of handle and hinge assembly, this is for illustrative purposes only, as any number of other ways for connecting the handle to the main body are contemplated.

Figure 2:
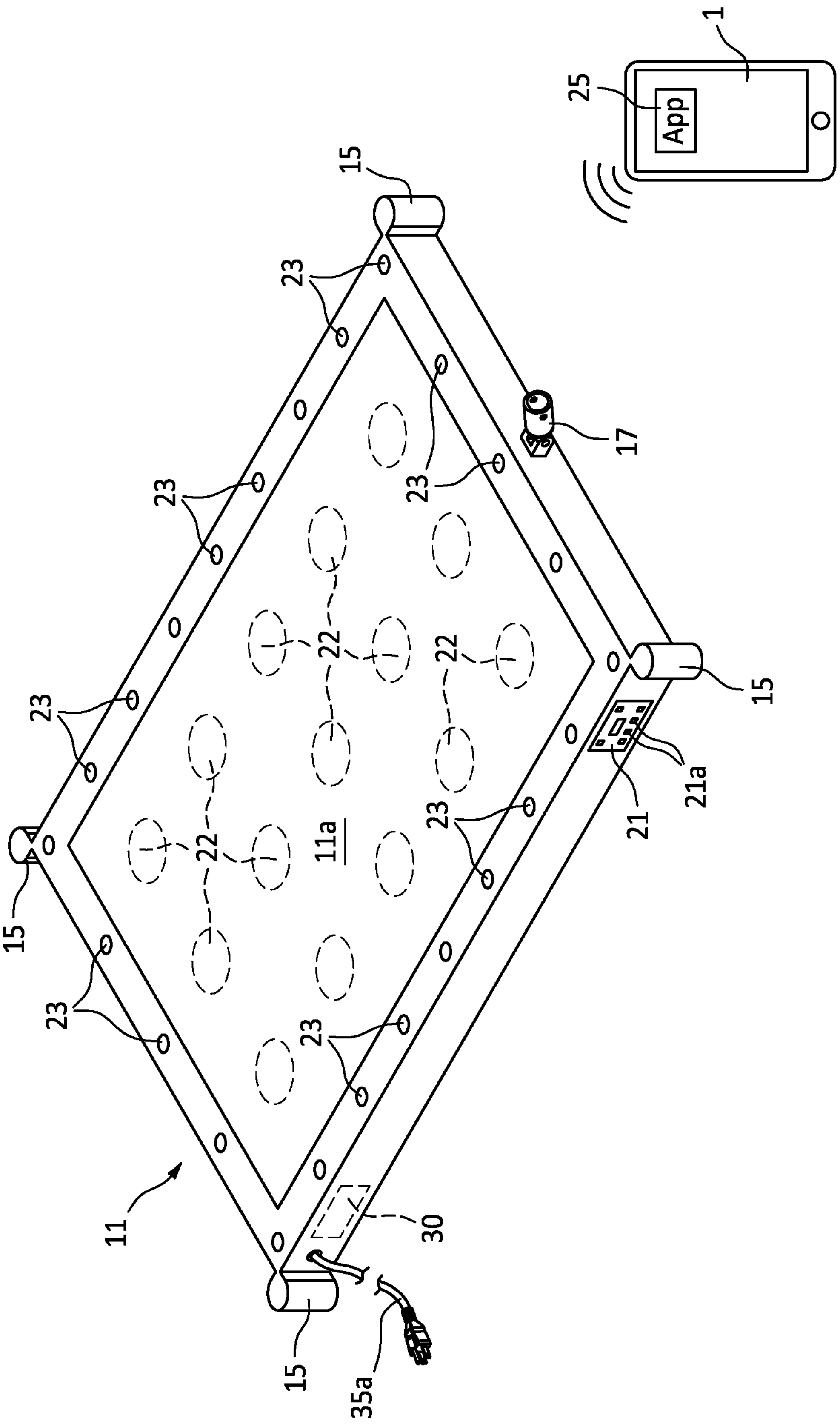
FIG. 2 is another perspective view of the tactile feedback platform in accordance with one embodiment of the invention.

As shown best at FIG. 2, one embodiment of the platform 10 can include an amplifier 21 that is positioned along or within the main body 11. The amplifier can be connected to the below described system controller 30 and can function to communicate directly with an external entertainment system such as a DJ controller/mixer, a gaming system, or any other type of audio-visual device, for example, depending on the intended use of the device. In one embodiment, the amplifier can include one or more cable jacks 21*a* for connecting with one or more communication cables such as XLR cables, RCA cables, TRS cables, TS cables and/or USB cables, among others for example. In the preferred embodiment, the amplifier can include an onboard digital signal processor (DSP) to add frequency compression to regulate the output from the below described tactile transducers.

Although described above as connecting to the external system via a communication cable, this is for illustrative purposes only, as other embodiments are contemplated wherein the amplifier 21 communicates wirelessly with the external system using an onboard wireless transceiver such as a wireless HDMI transmitter, for example and/or via the wireless transceiver provided in the system controller.

In one embodiment, a plurality of noiseless tactile transducers 22 can be physically connected to the amplifier 21 and can be positioned within the main body so as to impart vibrations along the top surface 11*a* of the main body. To this end, each of the transducers can be located within the interior space of the main body and physically secured to the inside surface of the top wall to physically vibrate the top wall in accordance with the signals received from the external system. More specifically, in one embodiment, the transducers can function to vibrate, pulse or otherwise activate along with the beat of the music or sounds provided by the entertainment system.

One example of a suitable noiseless tactile transducer for use herein includes the model TST209 Tactile transducer that is commercially available from Clark Synthesis, for example. Of course, any number of other devices capable of providing the tactile feedback in the manner described herein are also contemplated.

In one embodiment, a plurality of lights 23 can be positioned along the main body and can function to provide selective illumination. In the preferred embodiment, each of the lights can include individual or strips of light emitting diodes capable of generating light in any number of different colors and intensities. The lights can be connected to the below described system controller for operation and can function as both an entertainment element for use during a performance and/or as a safety element for preventing a user from tripping on the platform.

In one embodiment, the platform 10 can include a system controller 30 which can be positioned within the main body. The system controller can also function to communicate wirelessly with a user enabled device such as a smartphone 1 running a mobile application 25.

As described herein, the platform control application 25 can include a set of instructions which can be loaded onto a portable electronic device 2 such as a smartphone, tablet pc or other processor enabled device to permit a user operating the device to control the operation of the platform 11.

Of course, the inventive concepts disclosed herein are not to be construed as limiting to a smartphone App, as virtually any type of instruction sets, in any form of programming language that can be executed on any type of processor enabled device are also contemplated.

Figure 3:
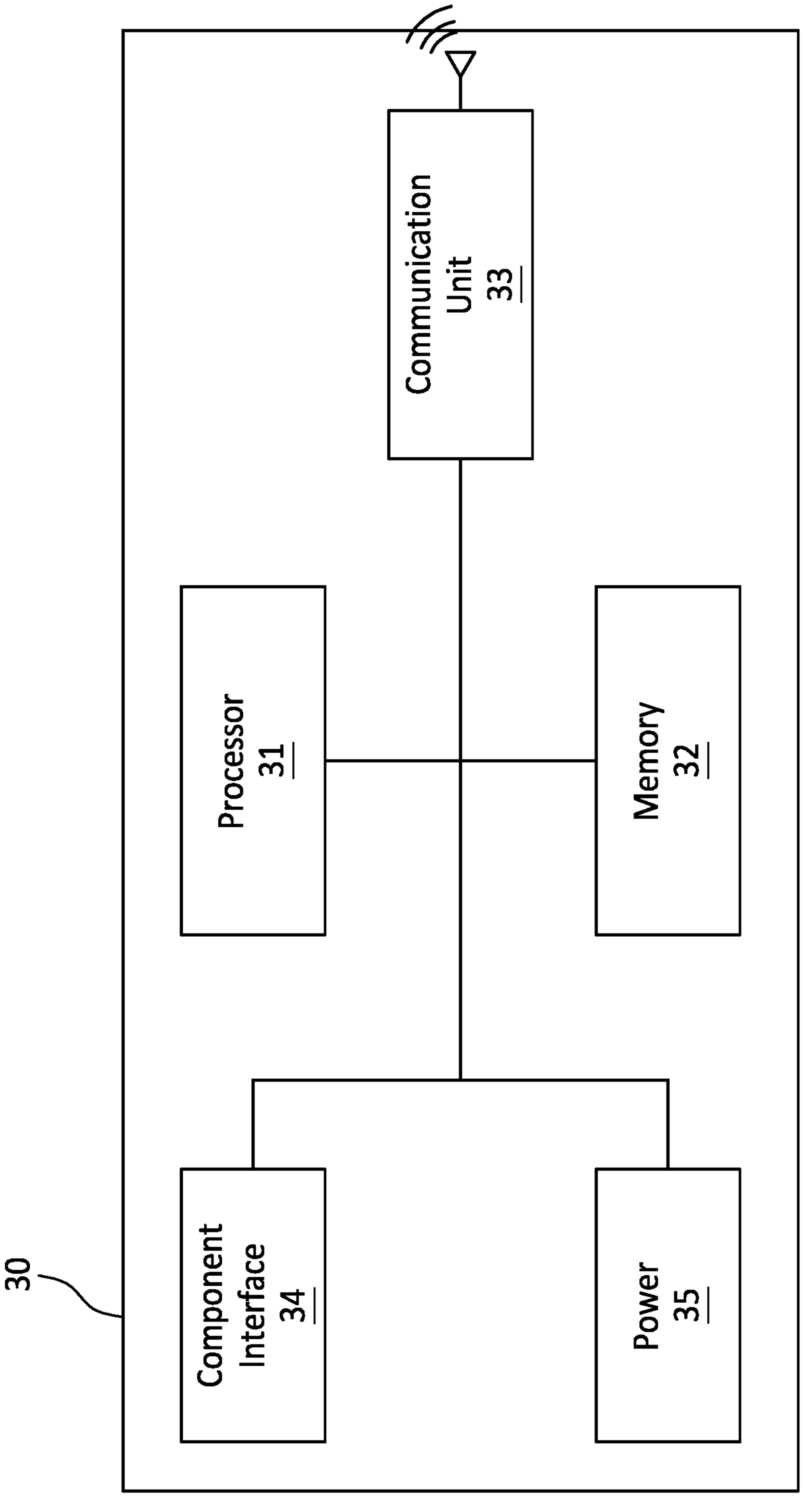
FIG. 3 is a simplified block diagram of the system controller of the tactile feedback platform in accordance with one embodiment of the invention.

FIG. 3 illustrates one embodiment of the system controller 30 for the platform 10. As shown, the controller can include a processor 31 that is conventionally connected to an internal memory 32, a communication unit 33, a component interface unit 34 and/or a power source 35.

Although illustrated as separate elements, those of skill in the art will recognize that one or more system components may comprise or include one or more printed circuit boards (PCB) containing any number of integrated circuit or circuits for completing the activities described herein. Moreover, portions of the controller 30 and amplifier 21 can be performed from a single device or integrated component rather than two separate components as illustrated. Of course, any number of other analog and/or digital components capable of performing the below described functionality can be provided in place of, or in conjunction with the below described controller elements.

The processor unit 31 can be a conventional central processing unit (CPU) or any other type of device, or multiple devices, capable of manipulating or processing information such as program code stored in the memory 32 and for causing the circuitry to complete the activities and functionality described herein.

Memory 32 can act to store operating instructions in the form of program code for the processor 31 to execute. Although illustrated in FIG. 3 as a single component, memory 32 can include one or more physical memory devices such as, for example, local memory and/or one or more bulk storage devices.

The communication unit 33 can include any number of components capable of sending and/or receiving electronic signals with an externally located device, either directly or over a network. In one embodiment, the communication unit can include a Bluetooth transceiver for communicating wirelessly with a user's smartphone or tablet device 2 that is running the mobile application 25. Of course, the communication unit is not limited to any particular type of wireless transceiver, as any number of other known transmission and reception mechanisms and protocols can also be utilized herein, several nonlimiting examples include various Near-Field-Communication (NFC) devices, radio transceivers, Wi-Fi transceivers, cellular transceivers and other such devices capable of communicating directly and/or over a network.

The component interface device 34 can function to provide a communicative link between the processor 31 and various other device components such as the amplifier 21, the transducers 22, and the lights 23, for example. In this regard, the component interface unit can include any number of different components such as one or more PIC microcontrollers, internal bus, USB connections and other such hardware capable of providing a direct link between the various components. Of course, any other components capable of providing the two-way communication between various system components can also be utilized herein.

As described herein, the power source 35 can include any number of components capable of providing the necessary power requirements to each element of the platform 10. In one embodiment, the power source 35 can include an A/C electrical power transformer and cord 35*a* capable of allowing the platform to be powered from a standard electrical outlet. Of course, other embodiments are also contemplated wherein the power source can include a plurality of onboard batteries which can function to supply power to the platform when no electrical outlet is available.

Figure 4:
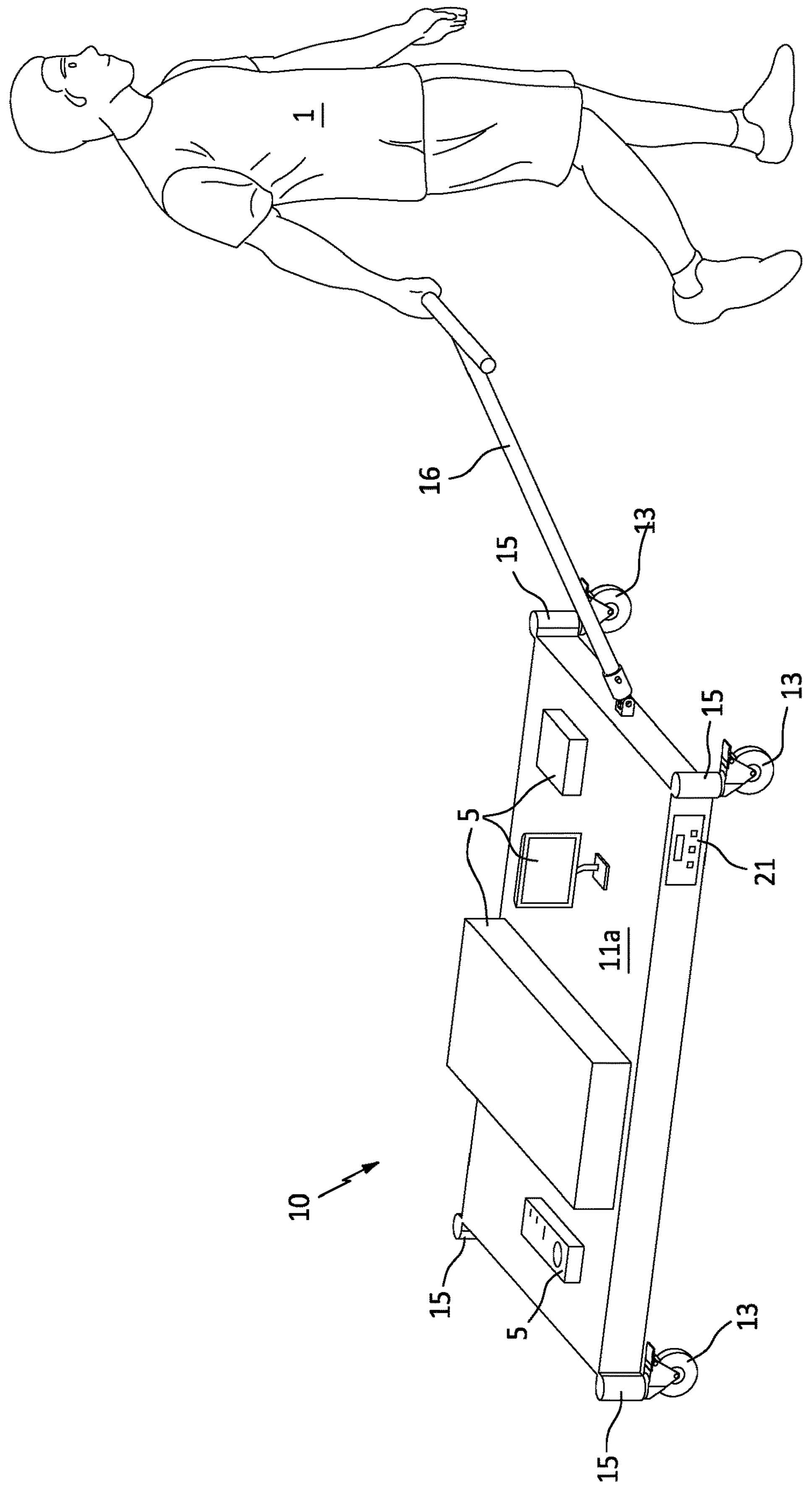
FIG. 4 is a perspective view of the tactile feedback platform in operation, in accordance with one embodiment of the invention
Figure 5:
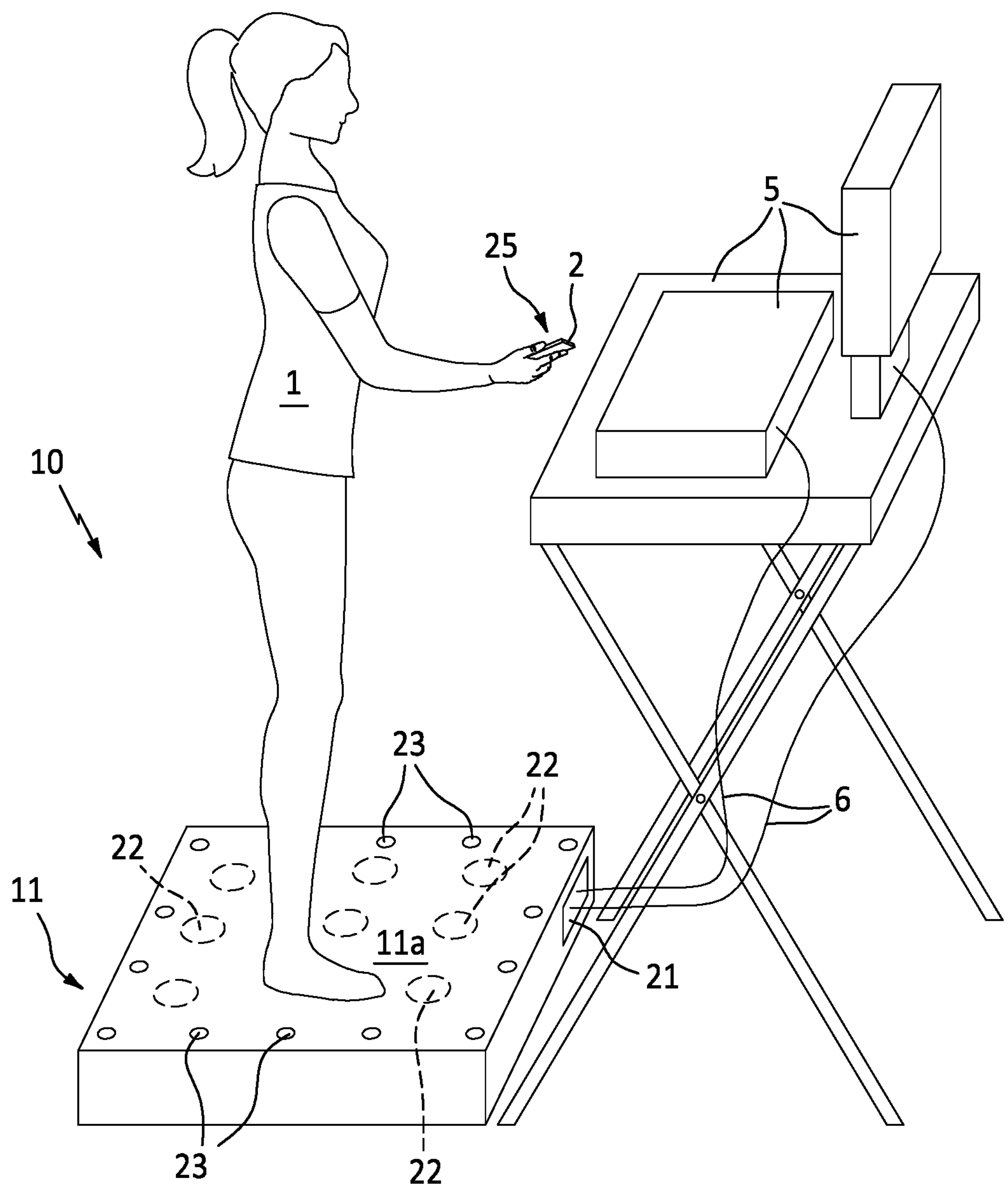
FIG. 5 is another perspective view of the tactile feedback platform in operation, in accordance with one embodiment of the invention

As shown at FIGS. 4 and 5, the platform 10 can be used as a dolly by a user 1 to transport any type of equipment such as entertainment equipment 5 to any desirable location. Once there, the wheels 13 and handle 16 can be removed, and the amplifier 21 can be connected to the external entertainment system 5, such as a DJ mixer, stereo, musical instrument, MIDI controller or gaming system, for example. Once connected via the cables 6, or wirelessly, the user 1 can stand on the top wall 11*a* of the platform wherein the tactile transducers can supply vibrations to the feet of the user in conjunction with the content being output from the external system.

Such a feature allows the user to "feel the music" without relying on loud music speakers. Moreover, the user can control the lights, the amplifier and the transducers using their personal electronic device via the mobile application. To this end, the user can connect to the external system, adjust the intensity of the tactile transducers change the color of the lights and start/stop operation of all components using the app.

As noted above, the preferred embodiment of the platform 10 is intended to be portable in nature, as such it is important that the device include a thin design. Therefore, in the preferred embodiment, the main body will include a thickness (e.g., distance between the top wall 11*a* and the bottom wall 11*b*) of between 1 and 5 inches. Of course, other embodiments are contemplated wherein other thicknesses are also contemplated.

As described herein, one or more elements of the tactile feedback platform 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. Likewise, the term “consisting” shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A platform, comprising:

a main body having a flat top wall, a flat bottom wall, a plurality of sides and an interior space;

a plurality of receptacles that are positioned along the main body;

a plurality of wheels that are configured to be removably positioned within the plurality of receptacles to allow the main body to roll along a ground surface;

an amplifier that is positioned along the main body, said amplifier including functionality for connecting to an external entertainment system;

a plurality of tactile transducers that are positioned along the main body; and a system controller that is in communication with each of the amplifier and tactile transducers, wherein the plurality of tactile transducers are configured to generate a vibration force onto the main body upon receiving a signal from the external entertainment system, and wherein the flat bottom wall is positioned directly onto the ground surface when the plurality of wheels are not positioned within the plurality of receptacles.

2. The system of claim 1, wherein the top wall of the main body includes a flat outer surface.

3. The system of claim 2, wherein the plurality of tactile transducers are arranged to impart the vibration force onto the top wall of the main body.

4. The system of claim 1, wherein the amplifier includes an input jack for communicating with a communication cable.

5. The system of claim 4, wherein the input jack includes at least one of an XLR cable jack, an RCA cable jack, a TRS cable jack, a TS cable jack, or a USB cable jack.

6. The system of claim 1, wherein the amplifier includes functionality for communicating wirelessly with the external entertainment system.

7. The system of claim 1, wherein the system controller includes:

a processor, a memory, and a wireless communication device.

8. The system of claim 7, wherein the wireless communication device is configured to send and receive operating instructions with a portable electronic device.

9. The system of claim 8, further comprising:

a tactile feedback platform application that includes machine readable instructions for execution on a portable electronic device, said application including functionality for remotely operating each of the amplifier and the plurality of tactile transducers.

10. The system of claim 9, further comprising:

a plurality of lights that are disposed along the main body.

11. The system of claim 10, wherein the tactile feedback platform application includes functionality for selectively operating the plurality of lights.

12. The system of claim 10 wherein the plurality of lights are configured as a safety device to illuminate the main body and each of the plurality of lights are positioned along the flat top surface of the main body at a location adjacent to each of the plurality of sides.

13. The system of claim 1, wherein each of the plurality of receptacles are positioned along the plurality of sides of the main body.

14. The system of claim 13, wherein none of the plurality of receptacles extend below the flat bottom wall of the main body.

15. The system of claim 1, wherein the plurality of wheels are configured to extend from and retract within the main body.

16. The system of claim 1, further comprising:

a handle that is removably connected to the main body.

17. The system of claim 16, further comprising:

a hinge mechanism that connects the handle to the main body.

18. The system of claim 17, wherein the handle includes an elongated pole, and the hinge mechanism permits omni-directional movement of the elongated pole.

19. The system of claim 17, wherein the hinge is positioned along one of the plurality of sides of the main body, and does not extend beyond the flat top wall of the main body.

* * * * *